United States Patent Office
2,907,697
Patented Oct. 6, 1959

2,907,697
THERAPEUTIC COMPOSITIONS

Edward L. Costello, New Rochelle, Albert J. Russo, Roslyn, and Martin A. Seidell, Scarsdale, N.Y., assignors to Chas. Pfizer & Co., Inc., Brooklyn, N.Y., a corporation of Delaware No Drawing. Application May 20, 1958
Serial No. 736,475

6 Claims. (Cl. 167—81)

This application relates to compositions primarily intended for use as a dietary supplement, and more particularly, to new and useful compositions containing vitamin $B_{12}$.

Vitamin $B_{12}$ is well known in the art and useful in the treatment of certain dietary deficiencies, for example, pernicious anemia and allied megaloblastic anemias. The vitamin is also known to be a vital factor in human basic metabolism, general health and vigor.

It has also been established that there are a number of vitamin $B_{12}$ materials commonly called cobalamins which possess approximately the same potency in therapy. In addition these vitamin $B_{12}$ materials are very similar in both chemical and physical properties. As employed herein the term, "vitamin $B_{12}$ materials," refers to mixtures of materials having vitamin $B_{12}$ activity as well as to individual vitamin $B_{12}$ compounds, e.g. cyanocobalamin, hydroxocobalamin and the like. As mentioned above bitamin $B_{12}$ materials may be employed in the treatment of certain dietary deficiencies, the most notable of which is pernicious anemia. Pernicious anemia is characterized by an increase in the size of red blood cells which is in some way associated with gastrointestinal and neuro-disturbances and is presumed due to internal deficiencies based on a defect in gastric secretions. As is well known vitamin $B_{12}$ blood levels of patients with such anemia have been found to be very low thus indicating the necessity for supplementary vitamin $B_{12}$. A method employed in providing vitamin $B_{12}$ in such cases has been the oral administration of a vitamin $B_{12}$ in aqueous solution together with a substance known as the intrinsic factor, the exact nature of which is not clearly known. The employment of various sources of intrinsic factor is absolutely essential for the successful absorption of vitamin $B_{12}$ in cases of anemia such as described above. One such source of intrinsic factor is gastric juices. The inclusion of such sources of intrinsic factor are in many ways disadvantageous. Generally, normal adults oral requirement for vitamin $B_{12}$ is estimated to be 5 mcg. per day. Certain deficiencies as described above may necessitate oral dosage of up to 50 mcg. per day.

It has been surprisingly found that glucosamine enhances the absorption of vitamin $B_{12}$ when concurrently administered. The increased effectiveness of vitamin $B_{12}$ absorption obviously provides more of vitamin $B_{12}$ in the blood to prevent the various results of dietary deficiencies as mentioned above. The increased effectiveness of vitamin $B_{12}$ absorption is evidenced by an increase in the urine level of the vitamin when compositions containing vitamin $B_{12}$ material and a glucosamine compound are administered to humans orally or when these materials are separately administered within a reasonable length of time, for example, within about one hour or so, i.e. concurrently administered.

The compositions of the present invention may be prepared with any vitamin $B_{12}$ material and glucosamine. The glucosamine may be utilized in any of its various forms, viz. glucosamine itself or a glucosamine salt. In general, the glucosamine should be employed in a ratio of at least 0.01 gram per mcg. of vitamin $B_{12}$ material to obtain significant enhancement of vitamin $B_{12}$ absorption. Higher ratios of glucosamine, of course, will produce greater enhancement of vitamin $B_{12}$ absorption. For example, a ratio of 0.02 gram of glucosamine per mcg. of vitamin $B_{12}$ gives higher levels of vitamin $B_{12}$ than the above ratio. Generally, up to 0.04 gram per mcg. of vitamin $B_{12}$ has been found to significantly increase the absorption of vitamin $B_{12}$. Higher proportions of glucosamine to vitamin $B_{12}$ may be employed. Of course, species of animals and individuals within the various species may vary to some extent in their response to the compositions and process of the present invention. However, in general, there is a definite and valuable response to these compositions and processes.

A variety of glucosamine salts may be used. These are formed from the base and a non-toxic acid, either organic or inorganic, for example, phosphoric, sulfuric, hydrochloric, hydrobromic, citric, tartaric, succinic, and so forth.

It has been found, as an example of the present valuable invention, that oral administration of aqueous solutions of vitamin $B_{12}$ together with from 0.01 to 0.04 gram of glucosamine per mcg. of vitamin $B_{12}$ resulted in substantially higher absorption of vitamin $B_{12}$ when compared with control solutions of the vitamin. To a group of ten human patients was administered solutions of 50 mcg. of vitamin $B_{12}$ containing radioactive cobalt in 30 cc. of water together with 1 gram of glucosamine. A second group of ten human patients was given the same solution without glucosamine. The vitamin $B_{12}$ urine levels of both groups were determined by counting an aliquot of a 24 hour urine collection in a scintillation well counter. The results are tabulated below:

AVERAGE URINE LEVEL

[Millimicrograms of $B_{12}$]

Vitamin $B_{12}$ plus glucosamine _____ 586.2
Vitamin $B_{12}$ _____ 485.2

Solid compositions of vitamin $B_{12}$ material and glucosamine may be readily prepared in the form of tablets or capsules, employing excipients such as certain types of clay, starch, tapioca etc. Such compositions may contain from about 5 to about 50 mcg. of vitamin $B_{12}$ together with a suitable amount glucosamine as indicated above.

Other dietary supplements may be included in the compositions of the present invention, for example, other B-complex vitamins, such as, vitamin $B_1$, $B_2$ and $B_6$, iron, and other vitamins such as vitamins A, D etc.

The following examples are given by way of illustration and are not to be construed as limitations of this invention many variations of which are possible within the scope and spirit thereof.

*Example I*

Aqueous solutions containing 50 mcg. of radioactive vitamin $B_{12}$ ($Co^{60}$) in 30 cc. of water were prepared. To ½ of these solutions was added glucosamine HCl, 1 gram to each 30 cc. The solutions were then administered to humans. The tabulated figures in Table I represents millimicrograms of vitamin $B_{12}$ extracted in 24 hours of urine utilizing the Schilling flushing technique.

TABLE I

| Vitamin $B_{12}$ | Vitamin $B_{12}$ plus Glucosamine |
|---|---|
| 502 | 512 |
| 563 | 460 |
| 725 | 322 |
| 425 | 687 |
| 386 | 722 |
| 480 | 780 |
| 500 | 670 |
| 462 | 422 |
| 484 | 907 |
| 325 | 380 |
| 485.2 | 586.2 |

The averages of these data indicate the enhancement of vitamin $B_{12}$ absorption by glucosamine.

Example II

The procedure of Example I was repeated employing 0.5 gram of glucosamine in each 30 cc. of solution containing 50 mcg. of vitamin $B_{12}$. Similarly, enhancement of vitamin $B_{12}$ absorption is noted.

Example III

The procedure of Example I was repeated employing 2 grams of glucosamine hydrochloride in each 30 cc. of solution containing 50 mcg. of vitamin $B_{12}$. Similarly, enhanced absorption of vitamin $B_{12}$ is noted.

Example IV

A mixture was prepared by blending glucosamine with crystalline vitamin $B_{12}$ in a ratio of 0.01 grams of glucosamine per mcg. of vitamin $B_{12}$. This mixture was added to a tablet base composed of the following:

| | Parts by weight |
|---|---|
| Sucrose U.S.P. | 80.3 |
| Tapioca starch | 13.2 |
| Magnesium stearate | 6.5 | to provide 5 mcg. of vitamin $B_{12}$ activity per tablet. These tablets are useful of the oral administration of vitamin $B_{12}$ in humans.

Example V

A mixture was prepared by blending glucosamine hydrochloride with vitamin $B_{12}$ in a ratio of 0.04 gram of glucosamine hydrochloride per mcg. of vitamin $B_{12}$. This mixture was added to a tablet base:

| | Parts by weight |
|---|---|
| Sucrose U.S.P. | 80.3 |
| Tapioca starch | 13.2 |
| Magnesium stearate | 6.5 | to provide 50 mcg. of vitamin $B_{12}$ activity per tablet. These tablets are useful of the oral administration of vitamin $B_{12}$ in humans.

Example VI

A mixture containing equal parts of cyanocobalamin and hydroxocobalamin was employed in place of vitamin $B_{12}$ in the composition of Example IV. The tablets produced are useful in oral administration to humans.

What is claimed is:

1. A composition which comprises a vitamin $B_{12}$ material and at least one compound selected from the group consisting of glucosamine and a glucosamine salt, said compound being present in a ratio of at least 0.01 gram per microgram of vitamin $B_{12}$ material.

2. A composition as claimed in claim 1 in which the glucosamine salt is glucosamine hydrochloride.

3. A composition which comprises a vitamin $B_{12}$ material and at least one compound selected from the group consisting of glucosamine and a glucosamine salt, said compound being present in a ratio of from about 0.01 gram to about 0.04 gram per microgram of vitamin $B_{12}$ material.

4. A composition which comprises a vitamin $B_{12}$ material and from about 0.01 gram to about 0.04 gram of a glucosamine salt per microgram of vitamin $B_{12}$ material.

5. A method for administering vitamin $B_{12}$ which method comprises orally administering to a host a vitamin $B_{12}$ material concurrently with a compound selected from the group consisting of glucosamine and a glucosamine salt, said compound being present in a ratio of from about 0.01 gram to about 0.04 gram per microgram of vitamin $B_{12}$ material.

6. A method as claimed in claim 5 in which the host is treated concurrently with a vitamin $B_{12}$ material and a glucosamine salt.

References Cited in the file of this patent

Latner: Biochem. Jour., Proc. of the Biochem. Soc., vol. 57, No. 3, July 1954, p. XIX.

Greenberg: Nature, vol. 180, Dec. 21, 1957, pp. 1401–1402.